P. DORSEY.
ROD PACKING.
APPLICATION FILED APR. 8, 1910.
980,617.
Patented Jan. 3, 1911.
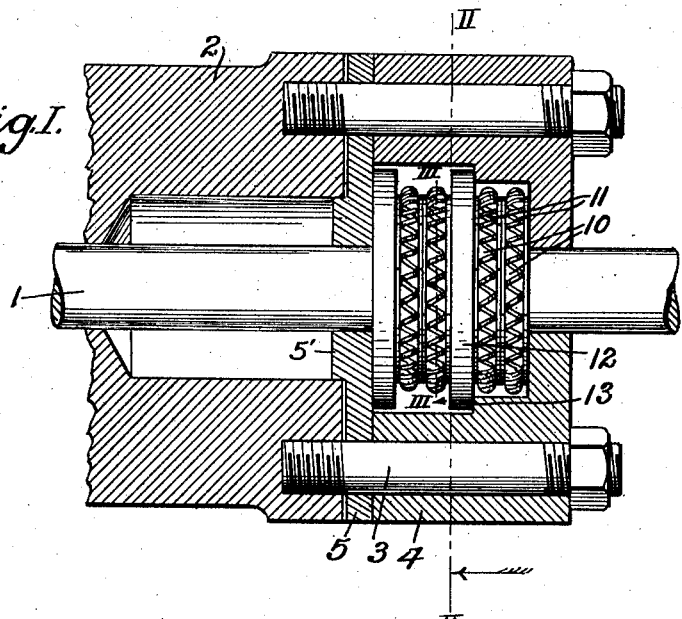
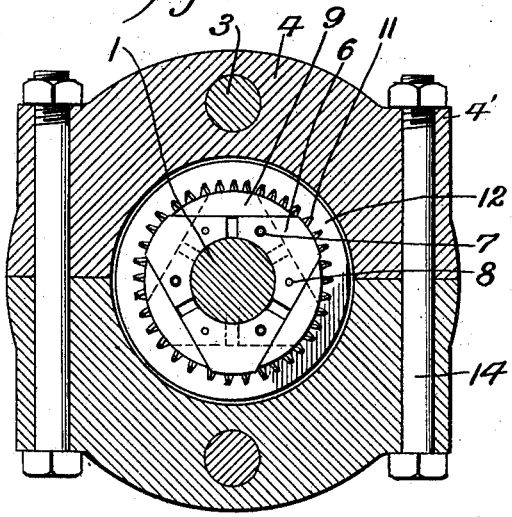
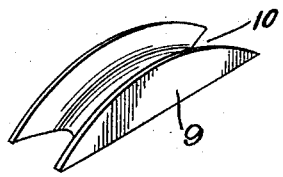
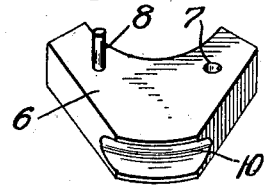
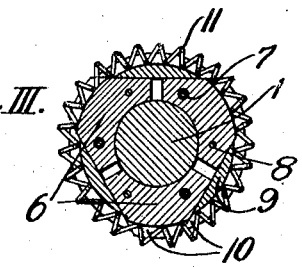
WITNESSES:
INVENTOR.
Parmer Dorsey.
BY
ATTORNEY.

UNITED STATES PATENT OFFICE.

PARMER DORSEY, OF HUTCHINSON, KANSAS.

ROD-PACKING.

980,617.     Specification of Letters Patent.     Patented Jan. 3, 1911.

Application filed April 8, 1910. Serial No. 554,160.

*To all whom it may concern:*

Be it known that I, PARMER DORSEY, a citizen of the United States, residing at Hutchinson, in the county of Reno and State of Kansas, have invented certain new and useful Improvements in Rod-Packing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to rod packing and has for its object to provide a metal packing which may be easily and quickly applied to piston and like rods, and which, when applied thereto, will effectually prevent the escape of steam or fluid from the stuffing box through which the rod is passed. In accomplishing this object, I have provided the improved details of structure hereinafter described and pointed out in the claim, reference being had to the accompanying drawings, in which:—

Figure I is a longitudinal section of a stuffing box and piston rod provided with my improved packing. Fig. II is a cross section on the line II—II, Fig. I. Fig. III is a cross section through one of the packing rings. Fig. IV is a detail view of one of the ring sections. Fig. V is a detail view of a different ring section.

Referring more in detail to the parts:— 1 designates the piston rod, which is extended through an ordinary stuffing box 2 having gland bolts 3 by which the casing 4 is held to the box.

5 designates a plate which fits snugly around the piston rod and separates the stuffing box and casing, said plate being provided with a boss 5' that projects slightly into the chamber of the stuffing box.

Referring now to the sectional packing rings, 6 designates the body sections, which are substantially triangular in shape and have curved inner and outer faces; the inner faces being adapted to bear against a piston rod, and the outer faces having the grooves 10 for a purpose presently described. The inner corners of the body sections are cut at a right angle to the flat edges, so that the parts may be brought together to form a complete ring. In the face of at least one of the body sections of each packing ring is a socket 7, and a post 8, the post 8 of one ring being adapted for projection into the socket 7 in one of the sections of another ring, in order to prevent the two rings sliding on each other.

9 designates rim sections which are adapted to bear on the flat edges of the body sections, and have the grooves 10 adapted for coöperation with the grooves 10 of the body sections.

11 designates coil springs which are adapted to seat in the grooves 10 of the sectional rings 6—9 when the parts are assembled on a piston rod.

While the sectional rings would serve satisfactorily when used alone, I prefer to provide solid rings 12 which are adapted to fit over the piston rod and separate some of the sectional rings. I also prefer to provide the casing 4 with an inset shoulder 13, against which one of the solid rings 12 may bear, so that there may be a positive stop for the inner sectional rings which receive the thrust from the steam chamber. I also prefer, in order to facilitate the installation of the packing, to divide the casing 4 longitudinally and to provide flanges 4' at opposite sides of the casing members, through which bolts 14 may project.

In construction, each ring is preferably formed in six pieces, three of the pieces being triangular and having concaved inner faces corresponding to the curve of the rod to which the packing is to be applied, the side edges of these pieces being flat and the outer edge curved and grooved as illustrated. Three other pieces of the ring have grooved outer faces and are curved to correspond to the curve of the outer edges of the triangular pieces, the opposite faces being flat to fit against the flat edges of the body sections.

To install the packing, the plate 5 is first fitted over the rod and gland bolts and the boss 5' projected into the stuffing box chamber. One of the solid rings 12 is then slipped over the rod and moved flush against the outer face of the plate. One of the sectional rings is then assembled around the rod and the spring 11 set into the grooves to hold the sections together and around the rod, the size of the rings being such that when the packing is first installed, the edges of the triangular section 6 will not meet, but will leave open spaces therebetween. It will be noticed that the rim sections 9 bridge the open spaces between the triangular sections and cover portions of the outer edges of both triangular sections. When one of the sectional rings has been placed on the rod, a second sectional ring is applied so that the faces of the two bear against each other and the joints are broken, that is to say, the open spaces between the triangular sections of the first ring are covered by solid portions of the second ring parts, and vice versa. A second solid ring 12 is then applied, and then a number of other sectional rings. When all of the rings are in place, the parts of the casing 4 are brought together over the rod and packing and bolted together, so that the larger part of the casing chamber will contain the two solid rings and the sectional rings therebetween, the length of the casing chamber being such that the shoulder 13 will force the ring 12 inwardly and retain the inner rings in close contact and the outer portion of the casing will hold the outer rings together and against the outer ring 12.

When the packing is in use, steam escaping between the rod and plate 5 will come in contact with the inner ring 12, which receives the first thrust and presses the sectional rings outwardly, bringing the parts into closer contact to enable them to better resist the passage of the steam, and forcing the outer ring 12 against the casing shoulder, so that a solid backing is provided that makes possible the "packing" of the rings against each other. The arrangement and operation of the outer rings is the same as described with reference to the inner rings, with the exception that the ring 12, being held by the casing shoulder, cannot be forced against the outer sectional rings, the "packing" pressure on these rings coming only from the escaping steam.

It is apparent that should the rod be bent, the sectional rings will flex to allow the rod to pass, and that the solid rings may move laterally in the box, sufficient clearance being provided for that purpose. It is also apparent that, as the packing wears, the springs 11 will force the sections inwardly toward the rod, to maintain a close contact, and that as the sections move inwardly the joints or open spaces will be closed.

While I have described a specific number of rings, and a specific manner of installing the packing, it is apparent that such may be varied to meet different conditions.

Having thus described my invention, what I claim as new therein and desire to secure by Letters-Patent is:—

In a rod packing, the combination of a stuffing box, a plate adapted to seat on the end of the stuffing box and having a boss projected into the stuffing box chamber, a casing seated against said boss and having an offset chamber, means for securing said plate and said casing to the stuffing box, a rod extending through said plate and said casing, solid rings seated against said plate and against the shoulder in said casing, and sectional rings located between said solid rings and between the outer solid ring and the outer end of said casing.

In testimony whereof I affix my signature in presence of two witnesses.

PARMER DORSEY.

Witnesses:
  Mrs. M. W. POTTER.
  A. C. POTTER.